(12) United States Patent
Yun

(10) Patent No.: US 11,491,842 B2
(45) Date of Patent: Nov. 8, 2022

(54) MODULAR CASING FOR ROOFTOP AIR CONDITIONER FOR BUS

(71) Applicants: HYUNDAI MOTOR COMPANY, Seoul (KR); KIA MOTORS CORPORATION, Seoul (KR)

(72) Inventor: Nam-Seok Yun, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/103,410

(22) Filed: Nov. 24, 2020

(65) Prior Publication Data
US 2021/0394582 A1    Dec. 23, 2021

(30) Foreign Application Priority Data
Jun. 18, 2020    (KR) .................. 10-2020-0074223

(51) Int. Cl.
*B60H 1/00*    (2006.01)
(52) U.S. Cl.
CPC ..... *B60H 1/00535* (2013.01); *B60H 1/00371* (2013.01); *B60H 2001/00235* (2013.01)
(58) Field of Classification Search
CPC ............ B60H 1/00535; B60H 1/00371; B60H 2001/00235; B60H 1/245; F24F 7/025; F24F 2013/205; F24F 13/32; H05K 7/20172
See application file for complete search history.

(56) References Cited

U.S. PATENT DOCUMENTS

| 8,650,895 B2 * | 2/2014 | Zapotocky | ......... B60H 1/00542 62/200 |
| 2021/0215355 A1 * | 7/2021 | Fuse | ..................... F24F 13/065 |

FOREIGN PATENT DOCUMENTS

| CN | 107687702 | * | 2/2018 | .............. F24F 13/32 |
| DE | 102009058855 A1 | * | 2/2012 | ......... B60H 1/00371 |
| KR | 20140065656 | * | 5/2014 | ... B60H 2001/00235 |
| WO | WO-2008061519 A1 | * | 5/2008 | ......... B60H 1/00371 |

OTHER PUBLICATIONS

English Translation DE_102009058855 (Year: 2012).*
English Translation WO-2008061519-A1 (Year: 2008).*
English Translation KR20140065656 (Year: 2014).*
English Translation CN107687702 (Year: 2018).*

* cited by examiner

*Primary Examiner* — David J Teitelbaum
(74) *Attorney, Agent, or Firm* — Lempia Summerfield Katz LLC

(57) ABSTRACT

An air-conditioner casing for an air conditioner mounted on a ceiling of a bus are provided. The air-conditioner casing includes: a pair of bases having first and second bases which are installed to be spaced apart from and opposite to each other; and one or more shrouds coupled in a space between the first and second bases, in which the number of shrouds to be connected and installed in the casing may be determined based on a capacity of an air conditioner.

6 Claims, 12 Drawing Sheets

MODULAR CASING FOR ROOFTOP AIR CONDITIONER FOR BUS

CROSS-REFERENCE TO RELATED APPLICATIONS

This application claims priority and the benefit of Korean Patent Application No. 10-2020-0074223, filed on Jun. 18, 2020, of the entire contents of which are incorporated herein by reference in its entirety.

FIELD

The present disclosure relates to a casing for an air conditioner mounted on a ceiling of a bus.

BACKGROUND

The statements in this section merely provide background information related to the present disclosure and may not constitute prior art.

In general, an air conditioner is installed on a roof of a bus.

The air conditioner refers to a device that condenses high-temperature and high-pressure refrigerant gas, which is sent from a compressor, into a liquid by exchanging heat with outside air, and an outer side of the air conditioner is covered by a casing.

FIG. 1 illustrates an air conditioner casing for a bus in the related art.

The air conditioner casing in the related art is integrally formed. Shrouds 2 embedded with fans to be installed in an air discharge port of the air conditioner are coupled to a central portion of the casing. A pair of covers 3 and 4 is coupled to the casing 1 and disposed left and right sides at an upper side of the casing 1, and a shroud cover 5 is coupled to upper portions of the shrouds 2.

The casing and the shrouds of the air conditioner casing in the related art as described above are integrally manufactured. We have discovered that such integral manufacturing results in increased weight of the product and manufacturing costs.

Furthermore, integral manufacturing of the casing and the shrouds deteriorates maintainability because the casing and the shrouds need to be replaced entirely even when the casing or the shroud is only partially damaged.

SUMMARY

The present disclosure provides an air conditioner casing for a bus, in which the casing for a bus-mounted air conditioner is modularized into individual components, such that a weight of a vehicle and manufacturing costs may be reduced, and the modularized individual components may be used in common, thereby improving maintainability.

One form of the present disclosure provides a modular casing for a rooftop air conditioner for a bus, the casing including: a pair of first and second bases installed to be spaced apart from and opposite to each other, and one or more shrouds coupled in a space between the first and second bases spaced apart from each other, in which the number of shrouds to be connected and installed in the casing may be changed based on a capacity of an air conditioner.

The modular casing for a rooftop air conditioner for a bus according to the present disclosure as described above has an advantageous effect in that the casing for a bus-mounted air conditioner may be modularized into the individual components, thereby reducing the weight of the vehicle.

The advantageous effect is obtained that the use of the modularized components may reduce manufacturing costs and the common use of the individual modularized components may improve maintainability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
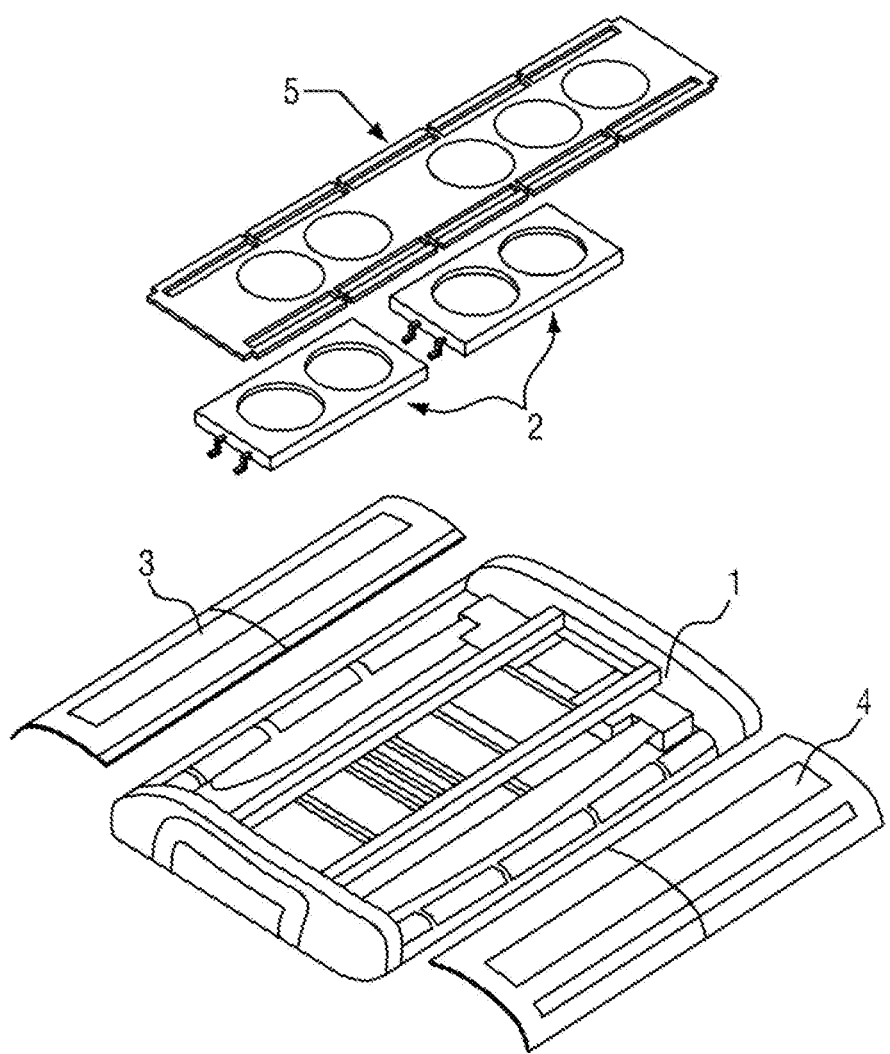
FIG. 1 is a view illustrating components of an air-conditioner casing in the related art.

The following description is merely exemplary in nature and is not intended to limit the present disclosure, application, or uses. It should be understood that throughout the drawings, corresponding reference numerals indicate like or corresponding parts and features.

Hereinafter, a modular casing for a rooftop air conditioner for a bus according to one form of the present disclosure will be described in detail with reference to the drawings.

However, the disclosed drawings are provided as an example for transferring the spirit of the present disclosure to those skilled in the art. Therefore, the present disclosure is not limited to the drawings disclosed below and may be specified as other aspects.

Unless otherwise defined, the terminologies used in the specification of the present disclosure have the meanings that a person with ordinary skill in the technical field to which the present disclosure pertains typically understands, and in the following description and the accompanying drawings, a detailed description of publicly known functions and configurations will be omitted so as to avoid unnecessarily obscuring the subject matter of the present disclosure.

Figure 2:
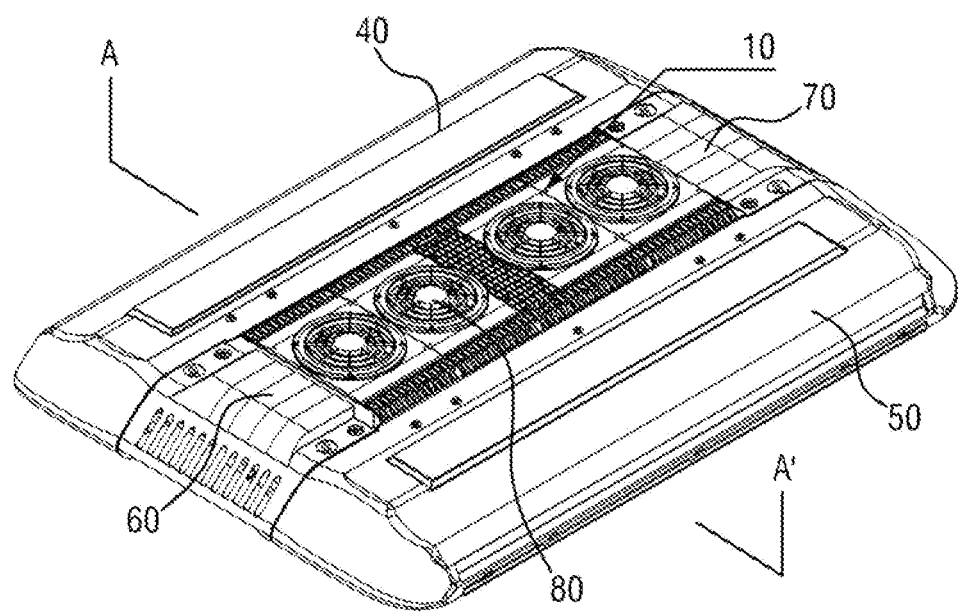
FIG. 2 is a perspective view of an air-conditioner casing according to one form of the present disclosure.
Figure 3:
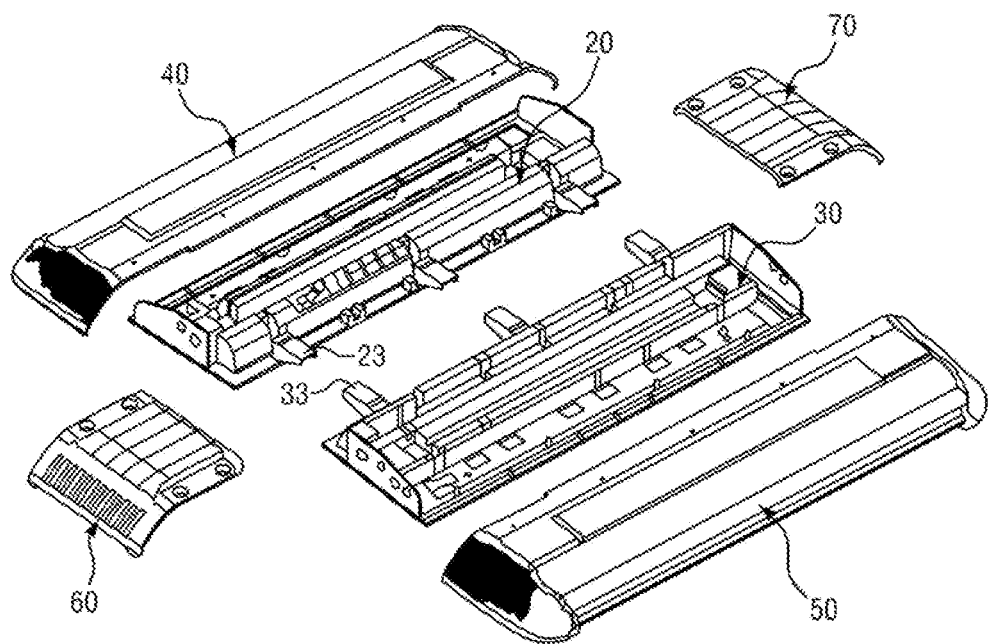
FIG. 3 is an exploded perspective view of the casing according to one form of the present disclosure.

FIG. 2 is a perspective view of an air-conditioner casing according to one form of the present disclosure, and FIG. 3 is an exploded perspective view of the casing according to one form of the present disclosure.

An air-conditioner casing 10 according to one form of the present disclosure includes: bases fixed onto a roof, and shrouds 80 installed in the base, in which the number of shrouds 80 to be installed may be changed depending on a capacity of an air conditioner.

More specifically, referring to the perspective view of the FIG. 2 and the exploded perspective view of FIG. 3, the casing 10 includes: a pair of bases comprising a first base 20 and a second base 30, which are attached to a roof of a bus such that the first base 20 and the second base 30 are spaced apart from and opposite to each other and configured to receive a condenser 90 (see FIG. 6) installed on the roof of the bus; a first cover 40 coupled to an upper portion of the first base 20 to shield the first base 20; a second cover 50 coupled to an upper portion of the second base 30 to shield the second base 30; front and rear covers 60 and 70 configured to shield front and rear surfaces of the first and second bases 20 and 30 installed opposite to each other; one or more shrouds 80 coupled in a space of the first and second bases 20 and 30 spaced apart from each other.

In one form, the first base 20 and the second base 30 are provided to be symmetrical to each other, the first cover 40 and the second cover 50 are provided to be symmetrical to each other, and the front cover 60 and the rear cover 70 are provided to be symmetrical to each other, such that the first base 20 and the second base 30 may be used in common, the first cover 40 and the second cover 50 may be used in common, and the front cover 60 and the rear cover 70 may be used in common, thereby reducing or minimizing the number of sets of molds used for manufacturing the first base 20, the second base 30, the first cover 40, the second cover 50, the front cover 60, and the rear cover 70.

The first base 20, the second base 30, the first cover 40, and the second cover 50 may be particularly made of a sheet molding compound (SMC) material, but may be made of other well-known materials capable of being used for an air-conditioner casing for a bus.

A method of coupling the first base 20 and the first cover 40, a method of coupling the second base 30 and the second cover 50, and a method of coupling the bases 20 and 30 and the front and rear covers 60 and 70 may all use a bolting method using bolts and nuts. However, there may be conceived a method of coupling one member and the other member by forming a rib or protrusion on one member, forming a channel or a through-hole, into which the rib or the protrusion is inserted, in the other member, and then coupling the rib or protrusion and the channel or through-hole. Alternatively, other well-known coupling methods may be employed.

Figure 4A:
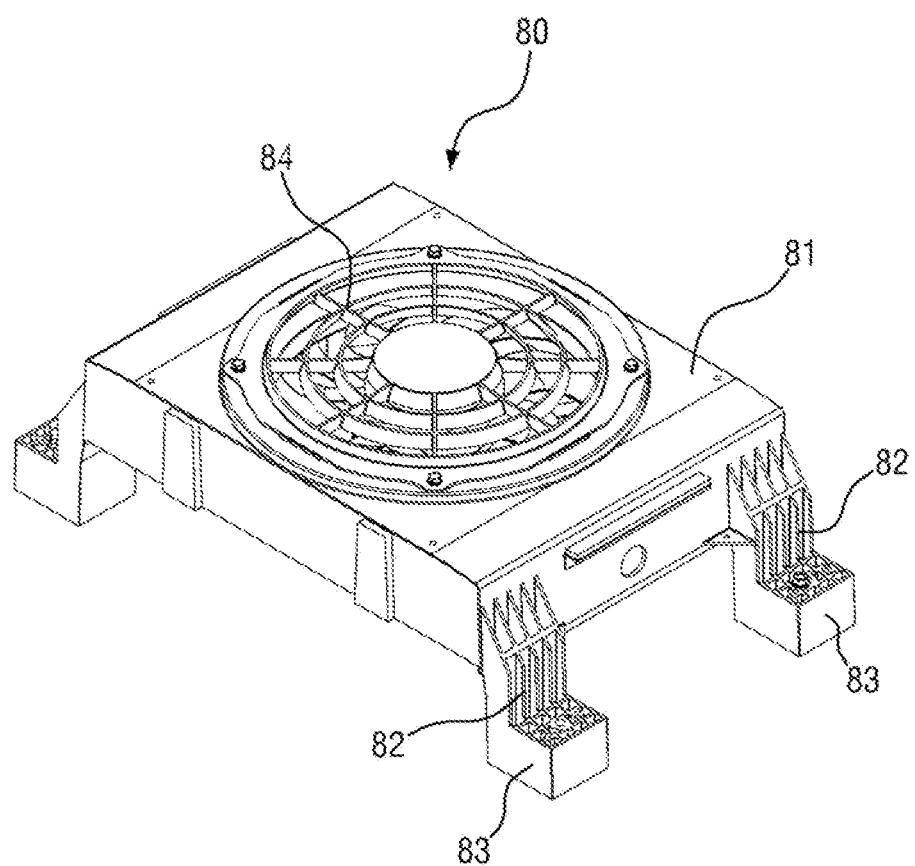
FIGS. 4A and 4B are a perspective view of the shrouds and a view illustrating a state in which the shrouds are connected according to one form of the present disclosure.
Figure 4B:
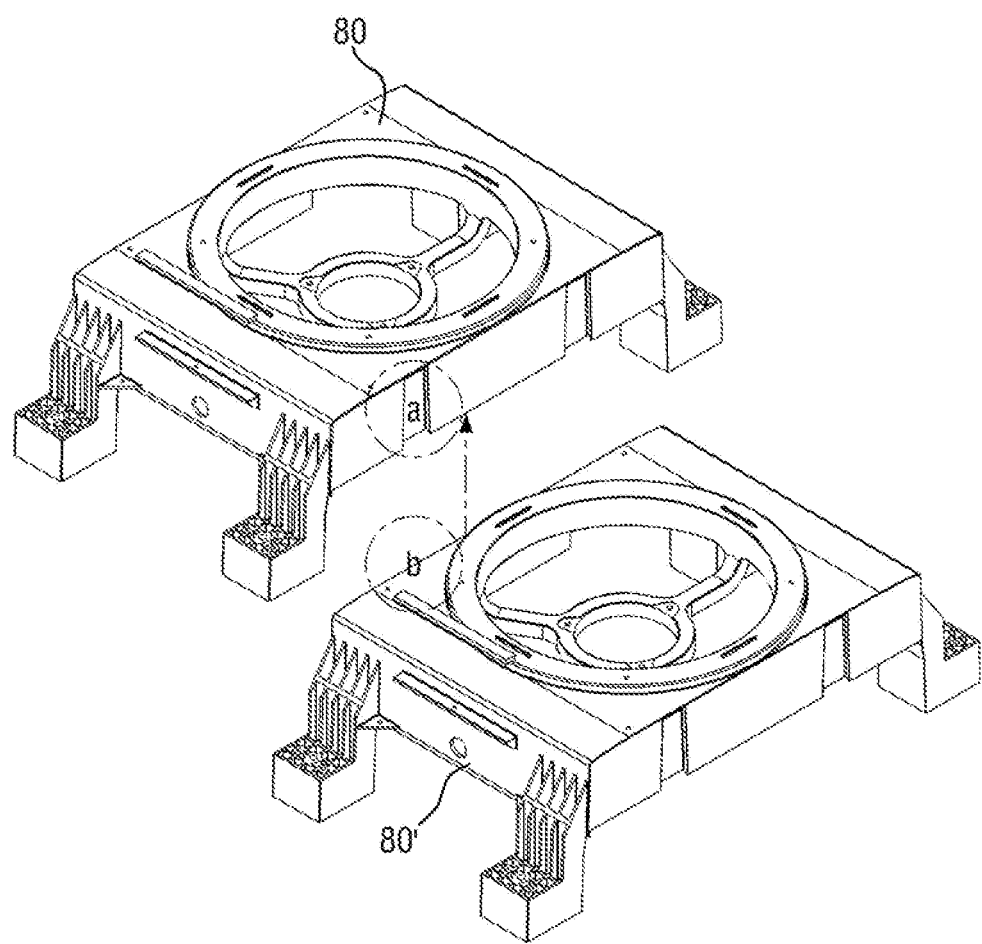
Figure 5A:
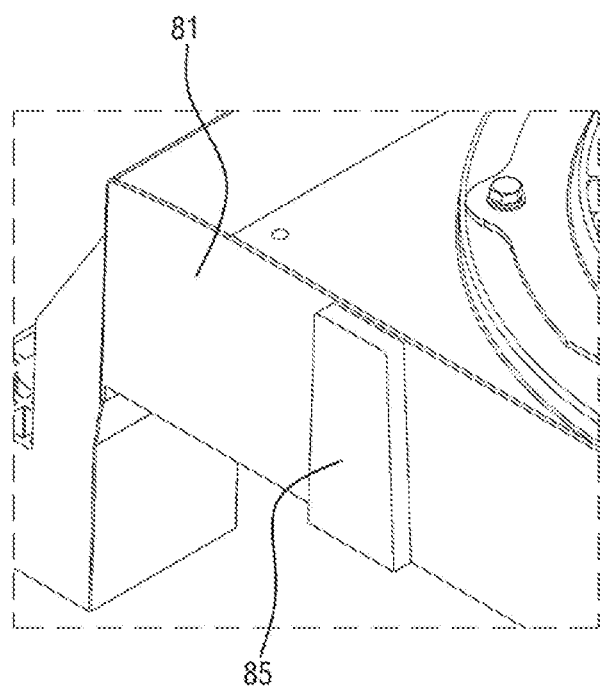
FIGS. 5A and 5B are a front partial perspective view and a rear partial perspective view of the shrouds according to one form of the present disclosure.
Figure 5B:
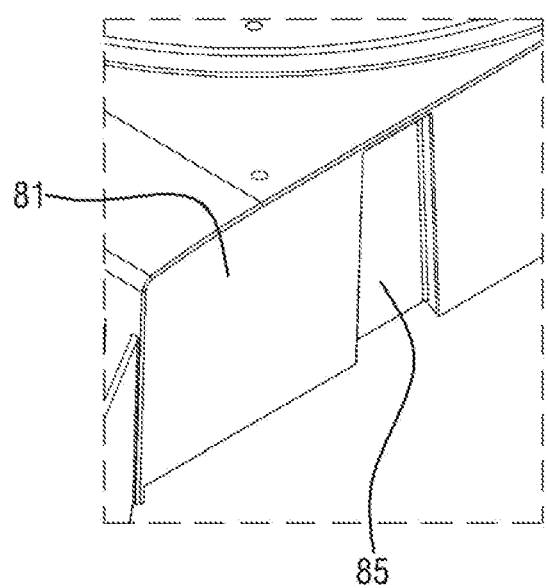

FIGS. 4A-4B and 5A-5B are views illustrating the shrouds of the casing according to the present disclosure, in which FIG. 4A is a perspective view, FIG. 4B is a view illustrating a state in which the shrouds are connected, and FIGS. 5A and 5B are a front partial perspective view and a rear partial perspective view.

The shroud 80 installed in the casing 10 according to one form of the present disclosure is modularized.

As illustrated in FIG. 4A, the shroud 80 according to one form of the present disclosure includes a bracket 81 having an opening formed at a center thereof and a fan 84 attached to the opening, a plurality of legs 82 extending downward from left and right surfaces of the bracket 81, and fixing pieces 83 each bent outward from an end of each of the legs 82.

When two or more shrouds 80 according to one form the present disclosure are coupled to the casing 10 as illustrated in FIG. 4B, a surface (a) of one shroud 80 and a surface (b) of the other shroud 80' may be coupled to each other.

To this end, as illustrated in FIGS. 5A and 5B, a protrusion 85 is formed on a front surface of the bracket 81 of the shroud 80, and a recess 86 into which the protrusion 85 is to be inserted is formed in a rear surface of the bracket 81 of the shroud 80.

Therefore, the protrusion 85 formed on the front surface of one shroud 80 is inserted into the recess 86 formed in the rear surface of the other shroud 80' adjoining one shroud 80, such that the two shrouds 80 and 80' may be securely coupled.

The single fan 84 is attached to the shroud 80 according to one form the present disclosure. Depending on climate of an area where the bus travels, the two or more shrouds 80 are installed in the space between the first and second bases 20, 30 that are spaced apart from each other.

Therefore, the casing 10 according to the present disclosure having the above-mentioned configuration of the shroud 80 employs a block-type shroud in which a fan assembly including a single fan and a single fan drive motor is installed on the single shroud 80 instead of employing the integrated shroud in the related art. The casing 10 has a so-called 'Lego' type configuration in which the number of block-type shrouds 80 to be installed may be adjusted in accordance with small, medium, and large capacities of the air conditioner mounted in the bus, and volumes of an evaporator, a condenser, and an air blower installed in the casing, such that the casing 10 may be used in common.

Figure 6:
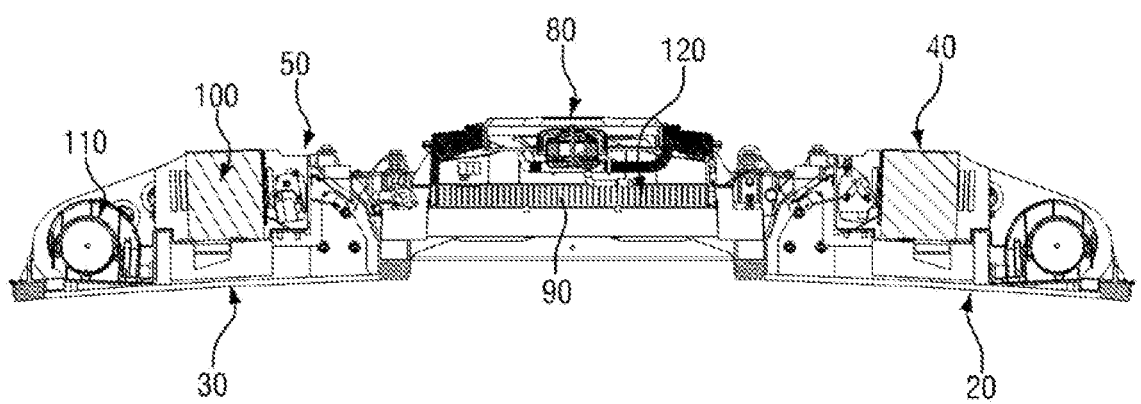
FIG. 6 is a cross-sectional view taken along line A-A' in FIG. 2.

FIG. 6 is a cross-sectional view taken along line A-A' in FIG. 2 and illustrates an interior of the casing 10 according to the present disclosure.

Referring to the drawing, an evaporator 100 and an air blower 110 are installed between the first base 20 and the first cover 40 of the casing 10 according to one form of the present disclosure, and an evaporator 100 and an air blower 110 are also installed between the second base 30 and the second cover 50.

The one or more shrouds 80 are coupled in the space between the first base 20 and the second base 30 that are spaced apart from and opposite to each other, and the condenser 90 is installed below the shroud 80.

Figure 7:
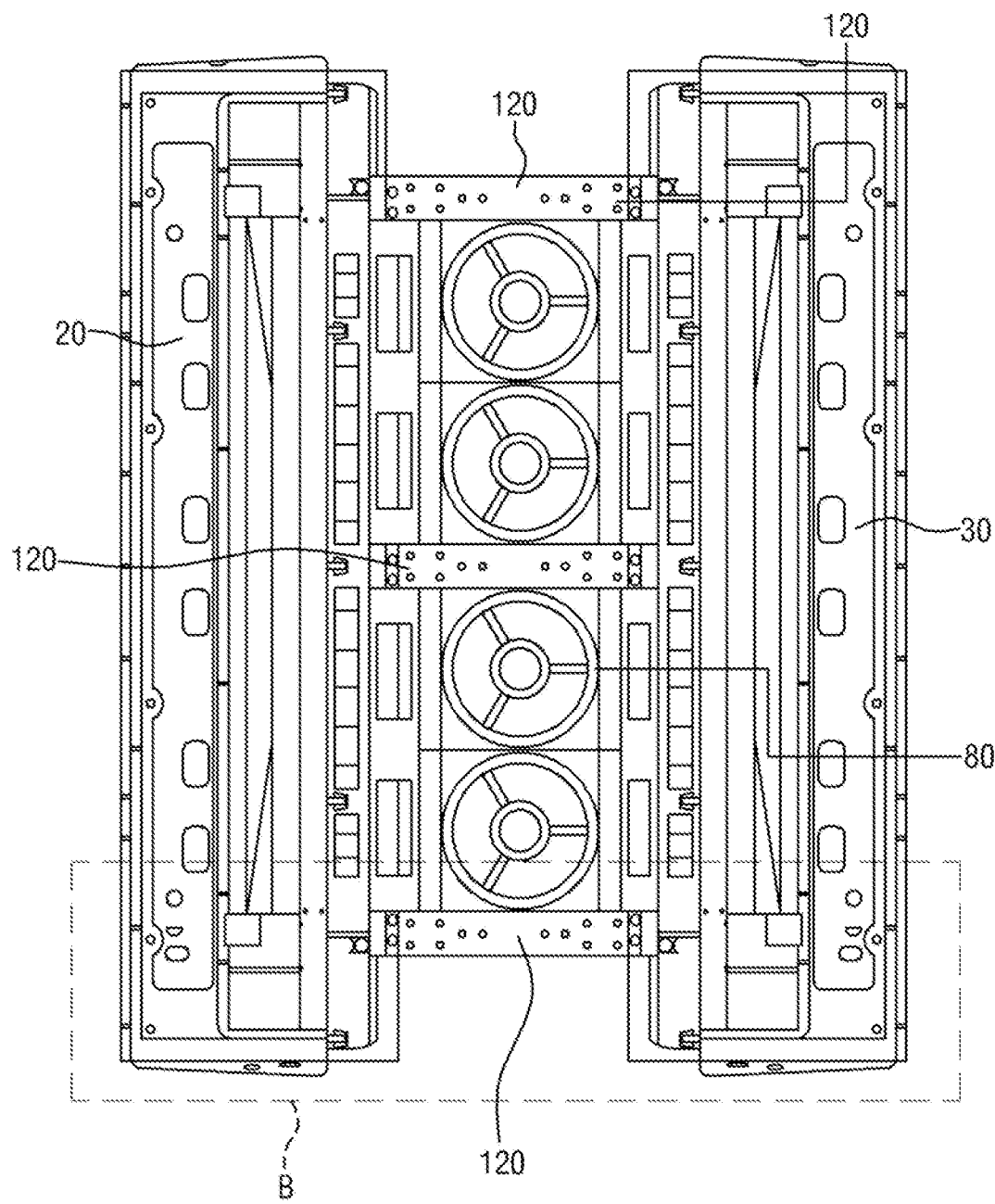
FIG. 7 is a top plan view illustrating a state in which a cover is removed from the casing according to one form of the present disclosure.

FIG. 7 is a top plan view illustrating a state in which the first cover 40 and the second cover 50 are removed from the casing according to one form of the present disclosure and illustrates connecting bars 120 that fasten the first base 20 and the second base 30 together.

The first base 20 and the second base 30 according to one form of the present disclosure are securely coupled and installed by the connecting bars 120, such that the first base 20 and the second base 30 more stably support the condenser 90, the evaporator 100, and the air blower 110 received in the casing 10.

The structure for coupling the first base 20 and the second base 30 will be described in more detail below.

Figure 8A:
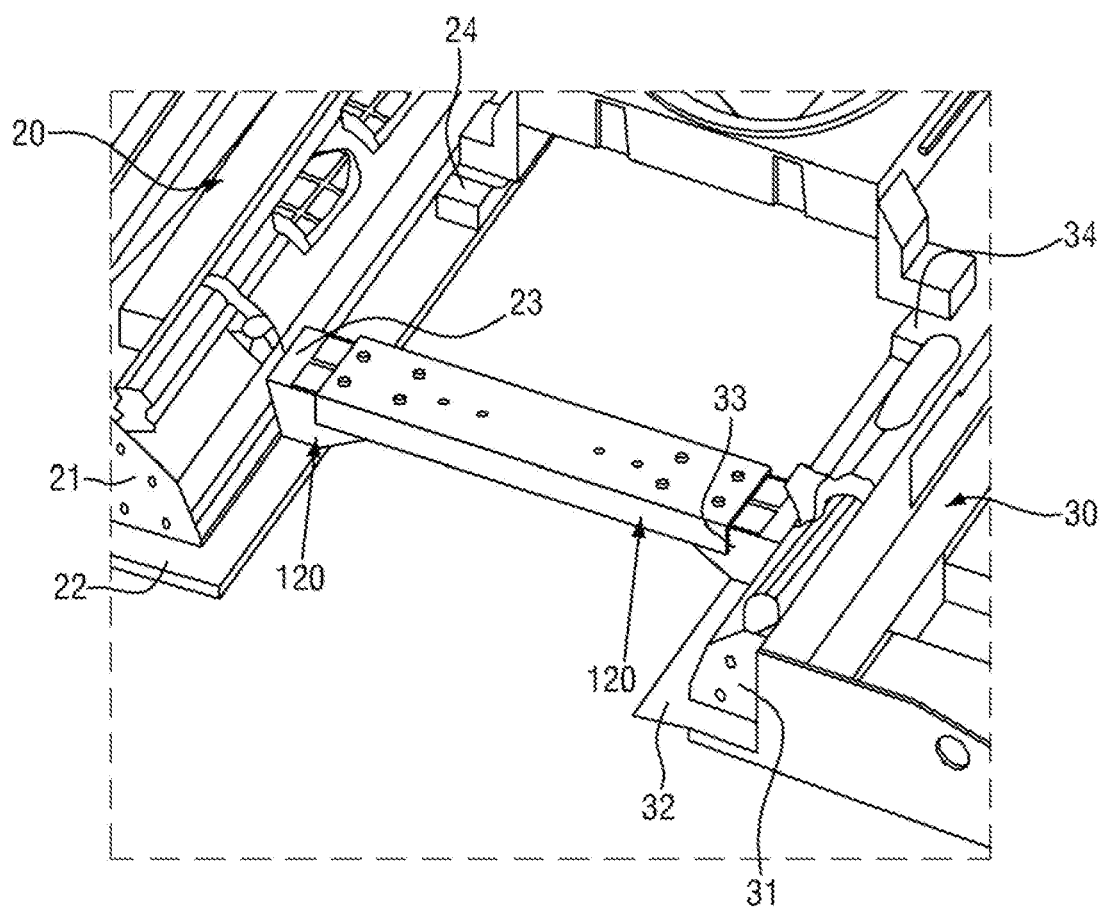
FIG. 8A is a detailed perspective view of part B in FIG. 7.
Figure 8B:
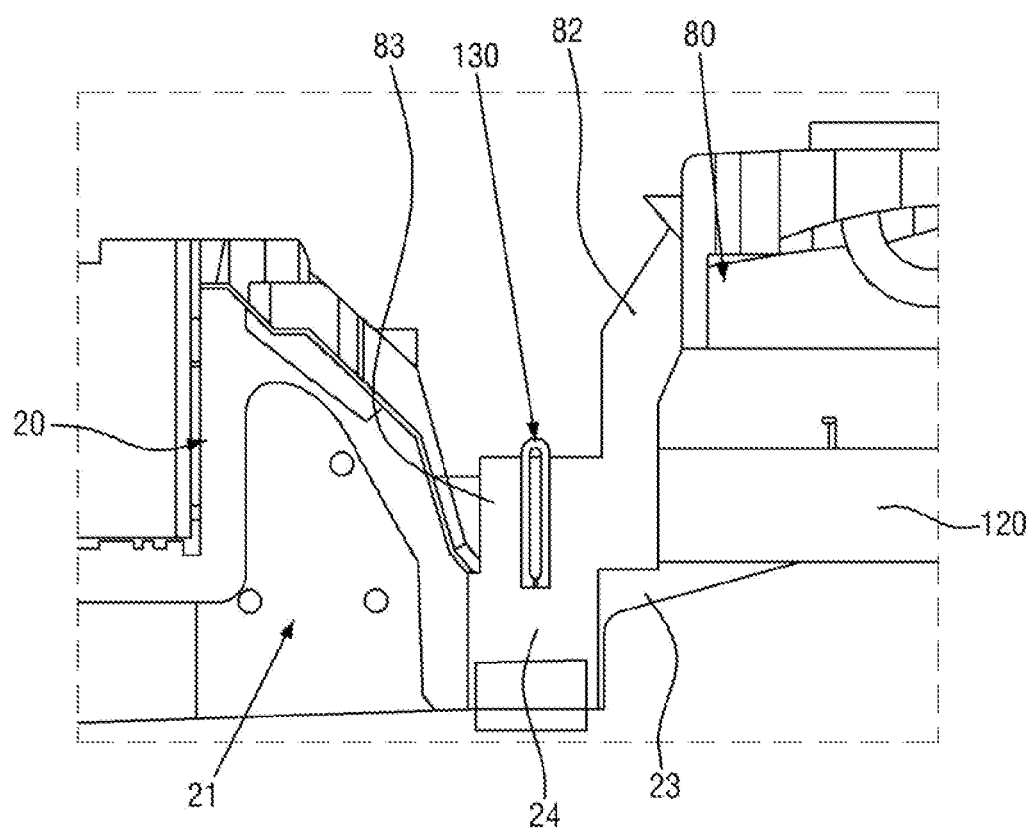
FIG. 8B is a partial cross-sectional view of part B illustrated in FIG. 7.

FIGS. 8A-8B are views illustrating a detail of part B illustrated in FIG. 7, in which FIG. 8A is a detailed perspective view of part B, and FIG. 8B is a partial cross-sectional view of part B.

According to one form of the present disclosure, as illustrated in FIG. 8A, a box-shaped boss 23 is installed to protrude inward from an inner wall 21 having an inner surface (i.e., a surface opposite to the second base 30) of the first base 20, a box-shaped mount 24 is attached to a bottom surface 22 of the first base 20, a box-shaped boss 33 is installed to protrude inward from an inner wall 31 having an inner surface (i.e., a surface opposite to the first base 20) of the second base 30, and a box-shaped mount 34 is attached to a bottom surface 32 of the second base 30.

The connecting bar 120 is fastened from above, by bolts (not illustrated), to the boss 23 of the first base 20 and the boss 33 of the second base 30, thereby securely coupling the first base 20 and the second base 30. As illustrated in FIG. 7, the plurality of connecting bars 120 may be installed. To this end, the plurality of bosses 23, 33 is installed on the bases 20 and 30, respectively.

As illustrated in FIG. 8B, in order to provide the structure for more securely coupling the first base 20 and the second base 30, the casing 10 according to the present disclosure is configured such that the fixing pieces 83 formed at the ends of the legs 82 of the shroud 80 installed between the inner walls 21, 31 of the first and second bases 20, 30 are fastened, by bolts 130, to the mounts 24, 34 attached to the bottom surfaces 22, 32 of the first and second bases 20, 30.

Figure 9:
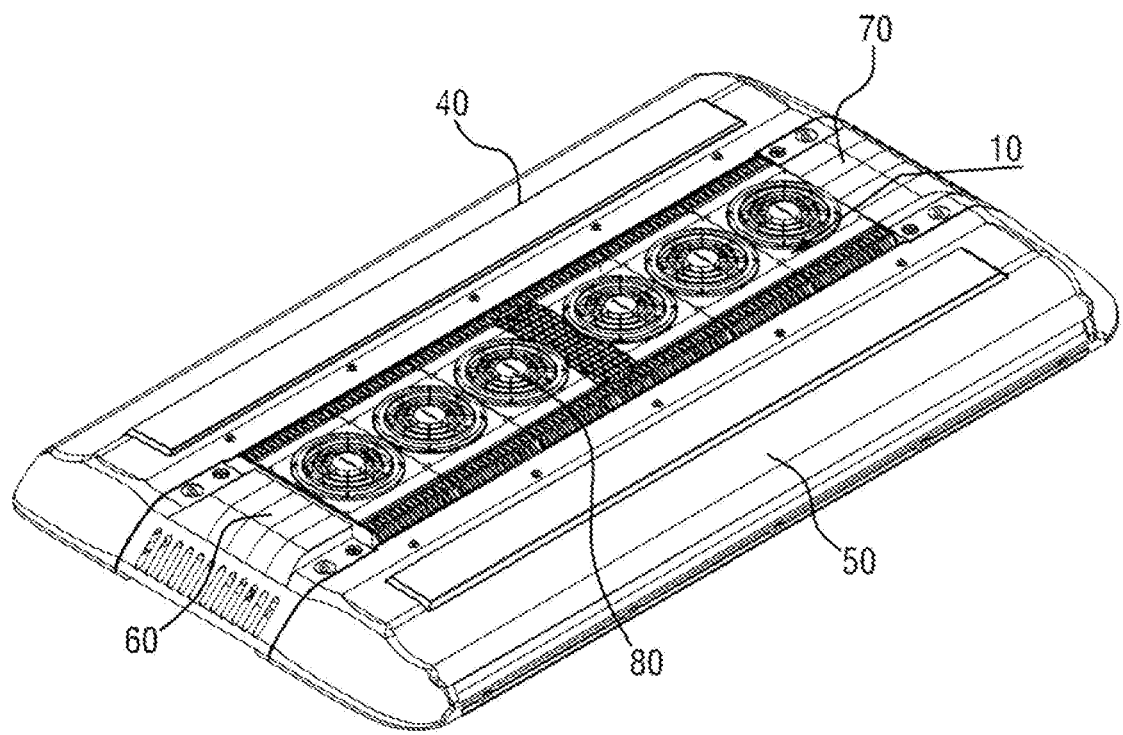
FIG. 9 is a perspective view of an air-conditioner casing according to another form of the present disclosure.

Meanwhile, FIG. 9 is a perspective view of an air-conditioner casing 10' according to another form of the present disclosure and illustrates an exemplary form different from the above-mentioned exemplary form in terms of the number of shrouds 80.

The single fan 84 is attached to the shroud 80 according to another form of the present disclosure. Depending on climate of an area where the bus travels, the two or more shrouds 80 are installed in the space between the first and second bases 20, 30 spaced apart from each other.

According to another form of the present disclosure, the four shrouds 80 may be installed on the condenser of the bus used in the low-temperature climate zone and the temperate climate zone, while the six shrouds 80 may be installed on the condenser of the bus used in the high-temperature climate zone. Another form is illustrated in FIG. 9 as the casing 10'.

Therefore, according to the casing 10 according to various forms of the present disclosure configured as described above, the components used for the casing for a bus-mounted air conditioner may be modularized into the individual components, and as a result, there is an advantageous effect in that it is possible to reduce a weight of a vehicle and manufacturing costs.

The advantageous effect is that the common use of the individual modularized components may improve maintainability of a vehicle.

What is claimed is:

1. An air-conditioner casing mounted on a roof of a bus, the air-conditioner casing comprising:
   at least one base fixed onto the roof; and
   at least one shroud installed in the at least one base,
   wherein the at least one base comprises a pair of bases including a first base and second base, wherein the first base and the second base are installed to be spaced apart from and opposite to each other, and the at least one shroud is installed in a space between the first base and second base,
   wherein the at least one shroud comprises:
   a bracket to which a fan is attached; and
   fixing pieces formed in the bracket,
   wherein a first mount is attached to a bottom surface of the first base, and a second mount is attached to a bottom surface of the second base, and
   wherein the fixing pieces are fastened to the first and second mounts of the first and second bases by using bolts.

2. The air-conditioner casing of claim 1, wherein the at least one shroud further comprises:
   a plurality of legs extending downward from left and right surfaces of the bracket,
   wherein each of the fixing pieces is bent outward from an end of each leg of the plurality of legs.

3. The air-conditioner casing of claim 2, wherein:
   the at least one shroud includes a first shroud and a second shroud,
   a protrusion is formed on a front surface of the bracket of the first shroud,
   a recess is formed on a rear surface of the bracket of the second shroud, and
   the protrusion formed on the front surface of the first shroud is inserted into the recess formed on the rear surface of the second shroud adjoining the first shroud.

4. The air-conditioner casing of claim 2, further comprising:
   a connecting bar having a first side coupled to a first boss installed on an inner wall of the first base and a second side coupled to a second boss installed on an inner wall of the second base configured to securely couple the first and second bases.

5. The air-conditioner casing of claim 1, further comprising:
   front and rear covers configured to shield front and rear surfaces of the pair of the first and second bases.

6. The air-conditioner casing of claim 1, further comprising:
   a first cover coupled to an upper portion of the first base that is configured to shield the first base; and
   a second cover coupled to an upper portion of the second base that is configured to shield the second base.

* * * * *